(12) United States Patent
Zhang et al.

(10) Patent No.: US 8,395,857 B2
(45) Date of Patent: Mar. 12, 2013

(54) SIMULATING DISCRETE TRACK MEDIA WITH CONTINUOUS MEDIA FOR HEAD EVALUATION

(75) Inventors: Kezhao Zhang, Fremont, CA (US); Jizhong He, San Jose, CA (US); Shanlin Duan, Fremont, CA (US); Jane Jie Zhang, San Jose, CA (US); Zhupei Shi, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 253 days.

(21) Appl. No.: 12/941,482

(22) Filed: Nov. 8, 2010

(65) Prior Publication Data

US 2012/0113538 A1 May 10, 2012

(51) Int. Cl.
*G11B 27/36* (2006.01)
*G11B 5/09* (2006.01)

(52) U.S. Cl. .......................................... 360/31; 360/48
(58) Field of Classification Search .................. None
See application file for complete search history.

(56) References Cited

U.S. PATENT DOCUMENTS

| | | | |
|---|---|---|---|
| 6,111,406 A * | 8/2000 | Garfunkel et al. | 324/210 |
| 6,680,609 B1 | 1/2004 | Fang et al. | |
| 6,751,036 B2 | 6/2004 | Quak et al. | |
| 6,778,343 B2 | 8/2004 | Nunnelley | |
| 7,035,026 B2 | 4/2006 | Codilian et al. | |
| 7,525,307 B2 | 4/2009 | Shen | |
| 7,529,050 B2 | 5/2009 | Shen et al. | |
| 7,688,540 B1 | 3/2010 | Mei et al. | |
| 7,706,096 B2 | 4/2010 | Ito et al. | |
| 2008/0094743 A1 * | 4/2008 | Shen et al. | 360/55 |
| 2009/0217510 A1 | 9/2009 | Katsumura | |
| 2009/0244755 A1 | 10/2009 | Mochizuki et al. | |
| 2009/0262446 A1 | 10/2009 | Mochizuki et al. | |
| 2009/0323209 A1 | 12/2009 | Kiyono | |
| 2010/0020428 A1 | 1/2010 | Mochizuki et al. | |

FOREIGN PATENT DOCUMENTS

| | | |
|---|---|---|
| CN | 1553434 | 12/2004 |
| JP | 6-84149 | 3/1994 |
| JP | 11-134601 | 5/1999 |
| JP | 2000339601 | 12/2000 |

OTHER PUBLICATIONS

Beach et al., "An Off-Track Capability Model Including Noise", IEE Transactions on Magnetics, vol. 34, No. 4, Jul. 1998, pp. 1961-1963.

(Continued)

*Primary Examiner* — Regina N Holder
(74) *Attorney, Agent, or Firm* — Brokaw Patent Law, P.C.; John D. Henkhaus

(57) ABSTRACT

Approaches for a testing device for selecting a discrete track media (DTM) format for use with a particular head of a hard-disk drive (HDD). The testing device comprises a continuous magnetic-recording disk, rotatably mounted on a spindle, which stores data using a continuous media format. The testing device also comprises a testing module configured to simulate reading data, stored using a discrete track media (DTM) format, from the continuous magnetic-recording medium. Advantageously, testing time and cost is reduced as both discrete track media (DTM) disks and expensive discrete track media (DTM) recording testing hardware are not required to select the optimal a discrete track media (DTM) format for use with a particular head of a hard-disk drive (HDD). In addition, embodiments may be used to optimize features of the tracks of the DTM disk, such as the land to groove ratio.

20 Claims, 7 Drawing Sheets

OTHER PUBLICATIONS

Huang et al., "Determination of the Narrow Read Width of Thin Film Magnetic Recording Heads Using an Error Rate Model", IEE Transactions on Magnetics, vol. 30, No. 6, Nov. 1994.

Vea et al.,"A Soft Error Rate Model for Predicting Off-Track Performane",IEE Transactions on Magnetics, vol. 31, No. 1, Jan. 1995.

* cited by examiner $f_1$, $f_2$, $f_3$ are the frequencies of different square wave patterns.

$$SNR = 10\log_{10} \frac{TAA_{Data}^2}{\alpha\, TAA_{Data}^2 + TAA_{OD}^2 + TAA_{ID}^2}$$

SIMULATING DISCRETE TRACK MEDIA WITH CONTINUOUS MEDIA FOR HEAD EVALUATION

FIELD OF THE INVENTION

Embodiments of the invention generally relate to the selection of a discrete track media (DTM) format for use with a particular head of a hard-disk drive (HDD).

BACKGROUND OF THE INVENTION

A hard-disk drive (HDD) is a non-volatile storage device that is housed in a protective enclosure and stores digitally encoded data on one or more circular disks having magnetic surfaces (a disk may also be referred to as a platter). When an HDD is in operation, each magnetic-recording disk is rapidly rotated by a spindle system. Data is read from and written to a magnetic-recording disk using a read/write head which is positioned over a specific location of a disk by an actuator.

A read/write head uses a magnetic field to read data from and write data to the surface of a magnetic-recording disk. As a magnetic dipole field decreases rapidly with distance from a magnetic pole, the distance between a read/write head and the surface of a magnetic-recording disk must be tightly controlled. An actuator relies on suspension's force on the read/write head to provide the proper distance between the read/write head and the surface of the magnetic-recording disk while the magnetic-recording disk rotates. A read/write head therefore is said to "fly" over the surface of the magnetic-recording disk. When the magnetic-recording disk stops spinning, a read/write head must either "land" or be pulled away onto a mechanical landing ramp from the disk surface.

The performance capabilities of a read/write head can vary significantly from head to head. This is so because several hundred or more processes may be involved in the manufacturing process of a head, which results in manufactured heads having a wide distribution of physical and performance characteristics. As performance of a head increases, the width of the track to which the head can write decreases. Thus, better performing heads can be used with narrower tracks.

Two common types of digital storage media are discrete track media (DTM) and continuous media. In discrete track media (DTM), tracks are pre-patterned with magnetic tracks (lands) separated by non-magnetic grooves. On the other hand, in continuous media, tracks are not pre-patterned and the surface of the disk does not contain any non-magnetic grooves.

When continuous media is used, the track format may be adapted during operation to reflect the particular performance characteristics (such as the signal to noise ratio) of the particular head used in the HDD. However, in discrete track media, tracks are pre-patterned on the magnetic-recording disk and the area between each track is constructed to be non-magnetic. Consequently, in discrete track media (DTM), the ability to customize the track format during operation is lost.

To accommodate the wide distribution of performance characteristics across read/write heads, multiple templates may be designed for a DTM magnetic-recording disk. Each template specifies a different design for physically laying out tracks on the disk. For example, different templates may specify different track pitches. When manufacturing a particular HDD employing a DTM disk, the performance capabilities of the actual head to be used in the HDD are evaluated. Once the performance capabilities of the head are known, the template having a track format that is best suited for the particular head being used in the HDD may be selected. After selecting the template that is best suited for the actual head to be used, the magnetic-recording disk may be pre-patterned with tracks according to the selected template.

SUMMARY OF THE INVENTION

One approach for selecting the track format for a given head is to test the head on multiple DTM magnetic-recording disks, each of which having a different track format, to identify on which track format the head performs best. Unfortunately, this approach increases testing time and complexity. Also, this approach is undesirable because it increases the turn-around time in product development, e.g., if there is any change in a DTM track format, one has to wait for the DTM disk having the new format to be fabricated before a heads can be matched to DTM track formats.

Embodiments of the invention provide for an improved approach for determining which discrete track media (DTM) track format is best suited for a particular head by simulating discrete track media (DTM) recording conditions using continuous media. In an embodiment, a testing device for selecting a discrete track media (DTM) format for use with a particular head of a hard-disk drive (HDD) comprises not a disk conforming to a DTM format, but instead, comprises a continuous magnetic-recording disk rotatably mounted on a spindle. The continuous magnetic-recording disk stores data using a continuous media format. The testing device of an embodiment comprises a testing module that is configured to simulate reading data, stored using a particular discrete track media (DTM) format, from the continuous magnetic-recording medium. Multiple DTM track densities/formats may be simulated by the testing device using a single continuous media disk.

Advantageously, using embodiments of the invention, testing time and cost is reduced as discrete track media (DTM) disks and expensive discrete track media (DTM) recording testing hardware are not required. In addition, embodiments may be used to optimize features of the tracks of the DTM disk, such as the land to groove ratio.

Embodiments discussed in the Summary of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for selecting of a particular discrete track media (DTM) format for use with a particular head of a hard-disk drive (HDD) are described. Embodiments of the invention employ a testing device that simulates a disk prepatterned in one or more discrete track media (DTM) formats using a magnetic-recording disk having tracks in the continuous media format. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments of the Invention

Embodiments of the invention may be embodied in a standard testing device for assessing the capabilities of a read/write head. Advantageously, testing devices according to embodiments use continuous media disks instead of discrete track media (DTM) disks.

Figure 1:
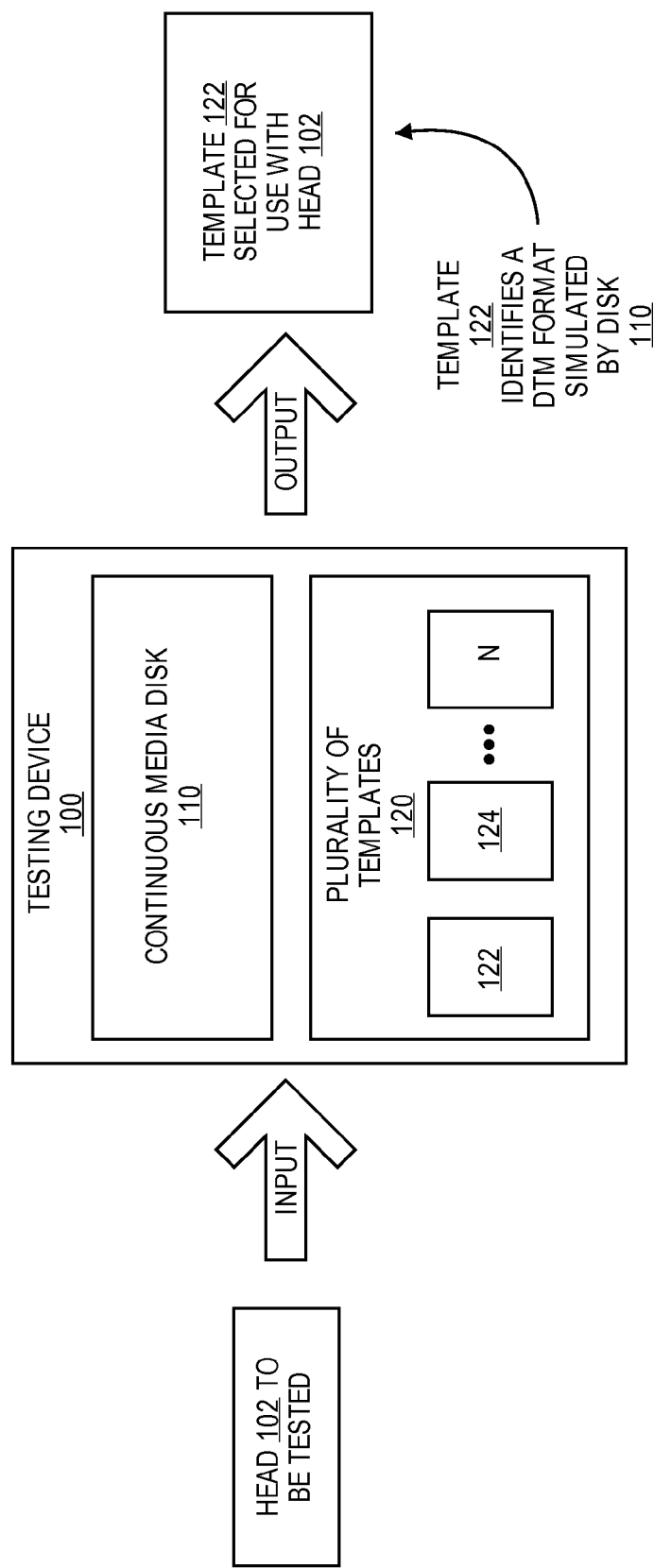
FIG. 1 is a block diagram of a testing device employing a continuous media disk according to an embodiment of the invention.
Figure 4:
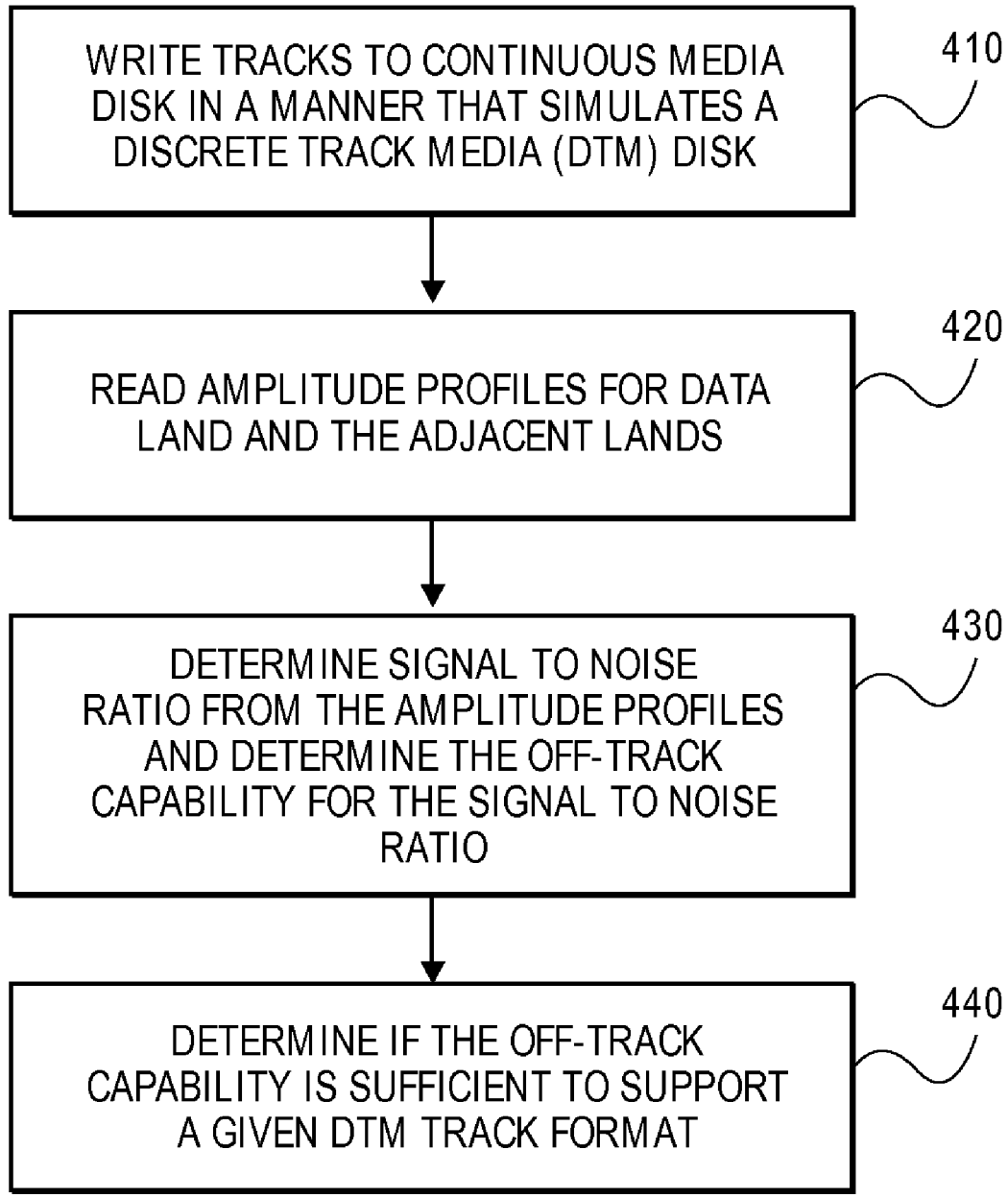
FIG. 4 is a flowchart illustrating the functional steps of determining which discrete track media (DTM) track format is best suited for a particular head by simulating discrete track media (DTM) recording conditions using a continuous media according to an embodiment of the invention.

FIG. 1 is a block diagram of testing device 100 employing continuous media disk 110 according to an embodiment of the invention. Testing device 100 may be used to select a particular template 122 from plurality of templates 120 for use with a particular head 102. Each template in plurality of templates 122 identifies a track format for use on a discrete track media (DTM). Testing device 100 may be implemented using a standard testing device for evaluating performance capabilities of heads. Testing device 100 is configured to perform the steps discussed below with reference to FIG. 4. In an embodiment, a standard testing device which may be modified to perform the steps of FIG. 4 is described in U.S. Pat. No. 7,525,307, which is incorporated by reference for all purposes as if fully set forth herein.

Physical Description of Illustrative Hard-Disk Drives (HDDs)

For purposes of providing a concrete example of contexts in which read/write heads, continuous media disks, and discrete media track (DTM) disks operate, the operation of a hard-disk drive (HDD) employing a magnetic-recording disk shall now be described; however, embodiments of the invention may be used in any type of storage media employing rotating platters or disks.

Figure 2:
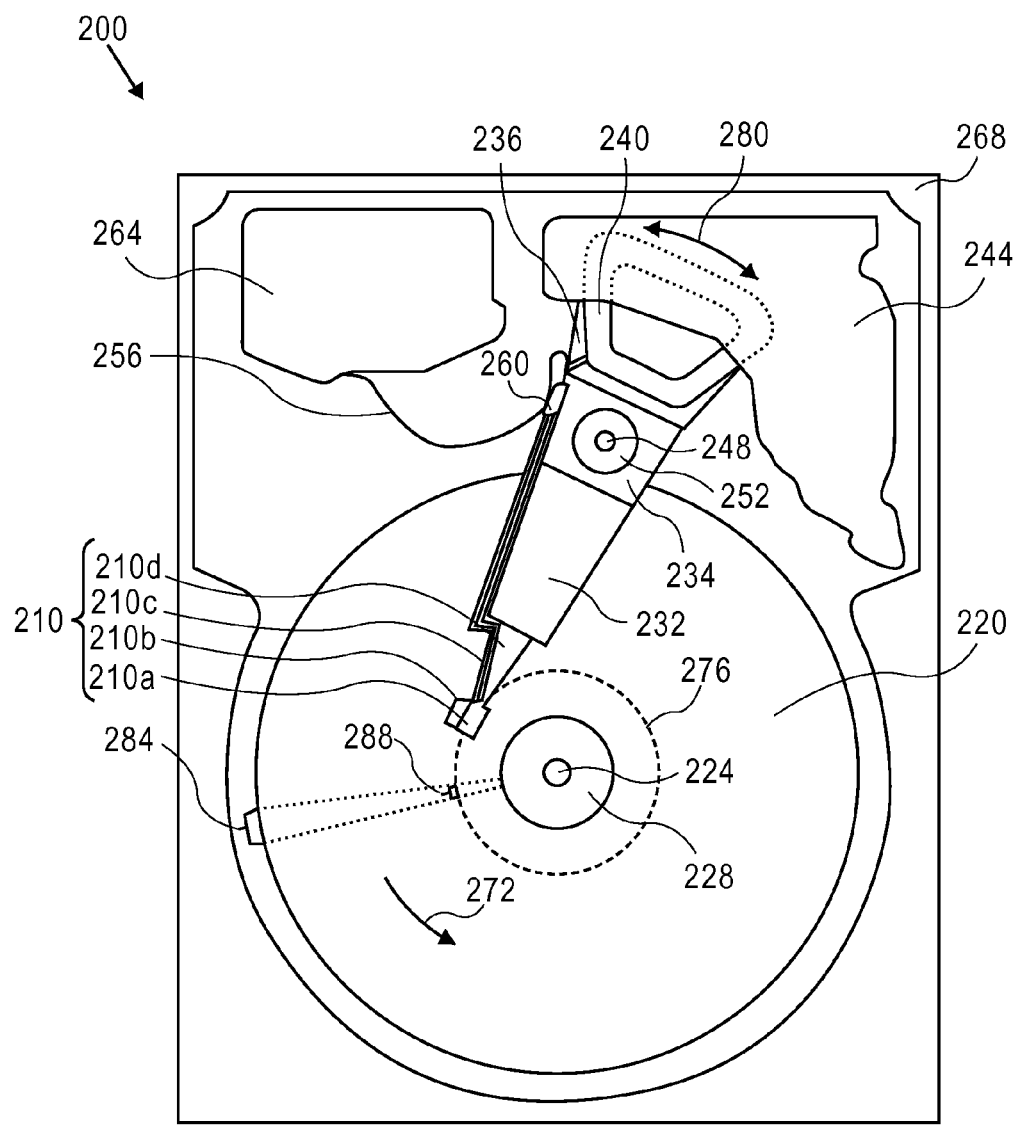
FIG. 2 is a plan view of an HDD according to an embodiment of the invention.

In accordance with an embodiment of the invention, a plan view of a HDD 200 is shown in FIG. 2. FIG. 2 illustrates the functional arrangement of components of the HDD including a slider 210b that includes a magnetic-recording head 210a. The HDD 200 includes at least one head gimbal assembly (HGA) 210 including the head 210a, a lead suspension 210c attached to the head 210a, and a load beam 210d attached to the slider 210b, which includes the head 210a at a distal end of the slider 210b; the slider 210b is attached at the distal end of the load beam 210d to a gimbal portion of the load beam 210d. The HDD 200 also includes at least one magnetic-recording disk 220 rotatably mounted on a spindle 224 and a drive motor (not shown) attached to the spindle 224 for rotating the disk 220. The head 210a includes a write element and a read element for respectively writing and reading information stored on the disk 220 of the HDD 200. The disk 220 or a plurality (not shown) of disks may be affixed to the spindle 224 with a disk clamp 228. The HDD 200 further includes an arm 232 attached to the HGA 210, a carriage 234, a voice-coil motor (VCM) that includes an armature 236 including a voice coil 240 attached to the carriage 234; and a stator 244 including a voice-coil magnet (not shown); the armature 236 of the VCM is attached to the carriage 234 and is configured to move the arm 232 and the HGA 210 to access portions of the disk 220 being mounted on a pivot-shaft 248 with an interposed pivot-bearing assembly 252.

With further reference to FIG. 2, in accordance with an embodiment of the present invention, electrical signals, for example, current to the voice coil 240 of the VCM, write signal to and read signal from the PMR head 210a, are provided by a flexible cable 256. Interconnection between the flexible cable 256 and the head 210a may be provided by an arm-electronics (AE) module 260, which may have an on-board pre-amplifier for the read signal, as well as other read-channel and write-channel electronic components. The flexible cable 256 is coupled to an electrical-connector block 264, which provides electrical communication through electrical feedthroughs (not shown) provided by an HDD housing 268. The HDD housing 268, also referred to as a casting, depending upon whether the HDD housing is cast, in conjunction with an HDD cover (not shown) provides a sealed, protective enclosure for the information storage components of the HDD 200.

With further reference to FIG. 2, in accordance with an embodiment of the present invention, other electronic components (not shown), including a disk controller and servo electronics including a digital-signal processor (DSP), provide electrical signals to the drive motor, the voice coil 240 of the VCM and the head 210a of the HGA 210. The electrical signal provided to the drive motor enables the drive motor to spin providing a torque to the spindle 224 which is in turn transmitted to the disk 220 that is affixed to the spindle 224 by the disk clamp 228; as a result, the disk 220 spins in a direction 272. The spinning disk 220 creates a cushion of air that acts as an air-bearing on which the air-bearing surface (ABS) of the slider 210b rides so that the slider 210b flies above the surface of the disk 220 without making contact with a thin magnetic-recording medium of the disk 220 in which information is recorded. The electrical signal provided to the voice coil 240 of the VCM enables the head 210a of the HGA 210 to access a track 276 on which information is recorded. Thus, the armature 236 of the VCM swings through an arc 280 which enables the HGA 210 attached to the armature 236 by the arm 232 to access various tracks on the disk 220. Information is stored on the disk 220 in a plurality of concentric tracks (not shown) arranged in sectors on the disk 220, for example, sector 284. Correspondingly, each track is composed of a plurality of sectored track portions, for example, sectored track portion 288. Each sectored track portion 288 is composed of recorded data and a header containing a servo-burst-signal pattern, for example, an ABCD-servo-burst-signal pattern, information that identifies the track 276, and error correction code information. In accessing the track 276, the read element of the head 210a of the HGA 210 reads the servo-burst-signal pattern which provides a position-errorsignal (PES) to the servo electronics, which controls the electrical signal provided to the voice coil 240 of the VCM, enabling the head 210a to follow the track 276. Upon finding the track 276 and identifying a particular sectored track portion 288, the head 210a either reads data from the track 276 or writes data to the track 276 depending on instructions received by the disk controller from an external agent, for example, a microprocessor of a computer system.

Embodiments of the invention also encompass HDD 200 that includes the HGA 210, the disk 220 rotatably mounted on the spindle 224, the arm 232 attached to the HGA 210 including the slider 210b including the head 210a.

Figure 3:
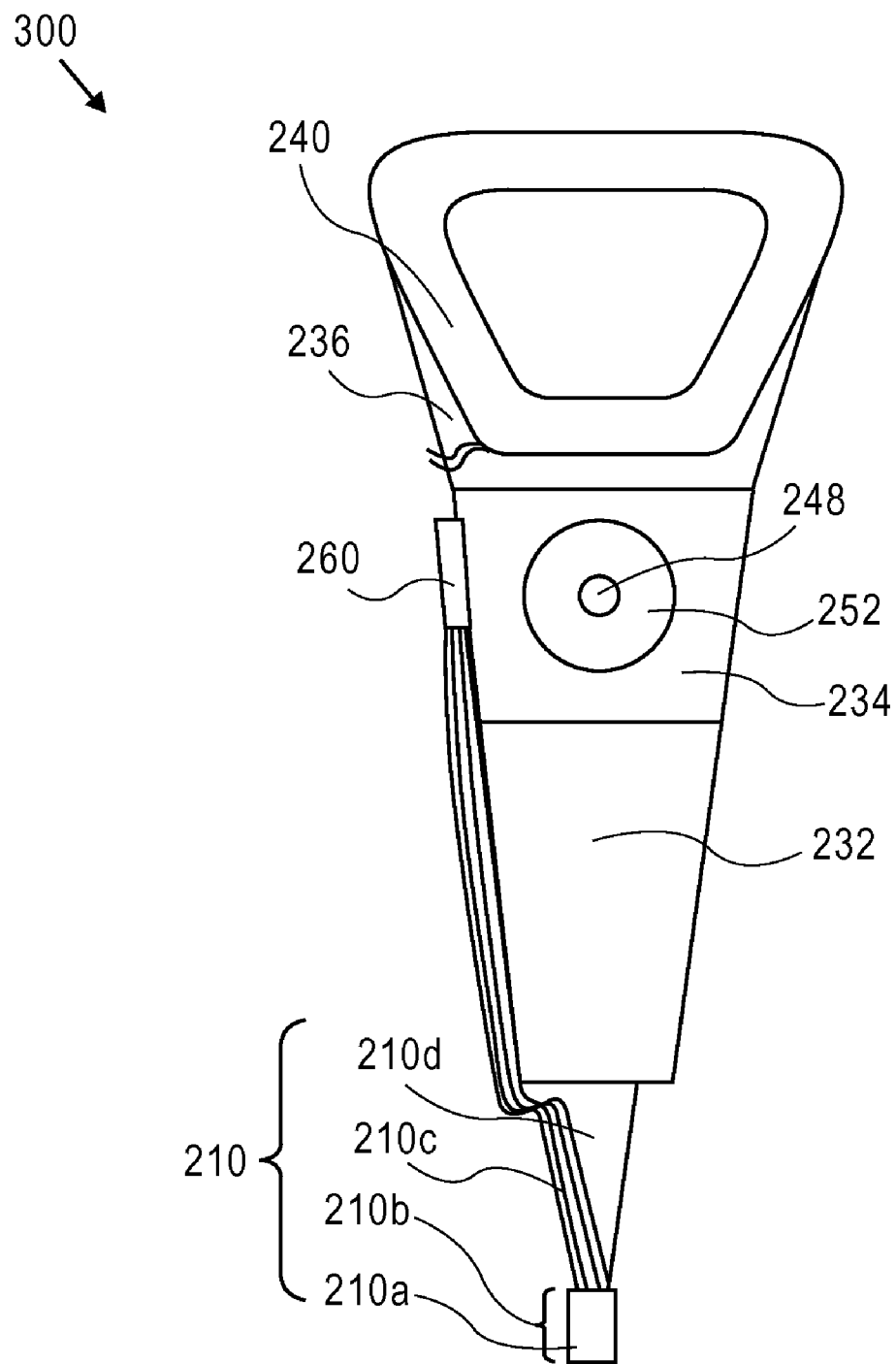
FIG. 3 is a plan view of a head-arm-assembly (HAA) according to an embodiment of the invention.

With reference now to FIG. 3, in accordance with an embodiment of the present invention, a plan view of a head-arm-assembly (HAA) including the HGA 210 is shown. FIG. 2 illustrates the functional arrangement of the HAA with respect to the HGA 210. The HAA includes the arm 232 and HGA 210 including the slider 210b including the head 210a. The HAA is attached at the arm 232 to the carriage 234. In the case of an HDD having multiple disks, or platters as disks are sometimes referred to in the art, the carriage 234 is called an "E-block," or comb, because the carriage is arranged to carry a ganged array of arms that gives it the appearance of a comb. As shown in FIG. 4, the armature 236 of the VCM is attached to the carriage 234 and the voice coil 240 is attached to the armature 236. The AE 260 may be attached to the carriage 234 as shown. The carriage 234 is mounted on the pivot-shaft 248 with the interposed pivot-bearing assembly 252.

Selecting a DTM Template Using an Embodiment

Embodiments of the invention perform analysis on a head to identify a track width that should be used with the head by considering the signal to noise ratio as a function of read back location. Initially, one frequency is used to write to a portion of a continuous media that simulates a data track of a discrete track media, and a different frequency is used to write to another portion of the continuous media that simulates the grooves of the discrete track media. A filter is then used to read back the signal written to the simulated data track. The best place to read a signal from a track is from the center of the track because as the read head moves from the center of the track, more noise from adjacent tracks is introduced into the readback signal. By measuring the off-track capability (OTC) of the head (explained and illustrated in more detail below), the amount that the track can be "squeezed," or narrowed, can be calculated. The higher the OTC of a head, the better the performance of the head and the narrower the track that can be supported.

FIG. 4 is a flowchart illustrating the functional steps of determining which discrete track media (DTM) track format is best suited for a particular head by simulating discrete track media (DTM) recording conditions using a continuous media according to an embodiment of the invention. In an embodiment, each step of FIG. 4 may be performed by testing device 100 of FIG. 1.

In step 410, testing device 100 writes tracks to continuous media disk 110 in a manner that simulates how data is written on a discrete track media (DTM) disk. On a discrete track media (DTM) disk, data is stored on areas of the disk having an exposed layer of magnetic material (referred to as lands) separated by areas lacking an exposed layer of magnetic material (referred to as grooves). A land corresponds to a track on which data is written, and a groove corresponds to the area between tracks. By convention, the particular land that is currently being written to is referred to as the "data land," while the lands which are immediately adjacent to the data land are referred to as the adjacent lands. An adjacent land which is closer to the inner diameter of the disk may be identified as the "adjacent land (ID)" and the adjacent land which is closer to the outer diameter of the disk may be identified as the "adjacent land (OD)."

Figure 5:
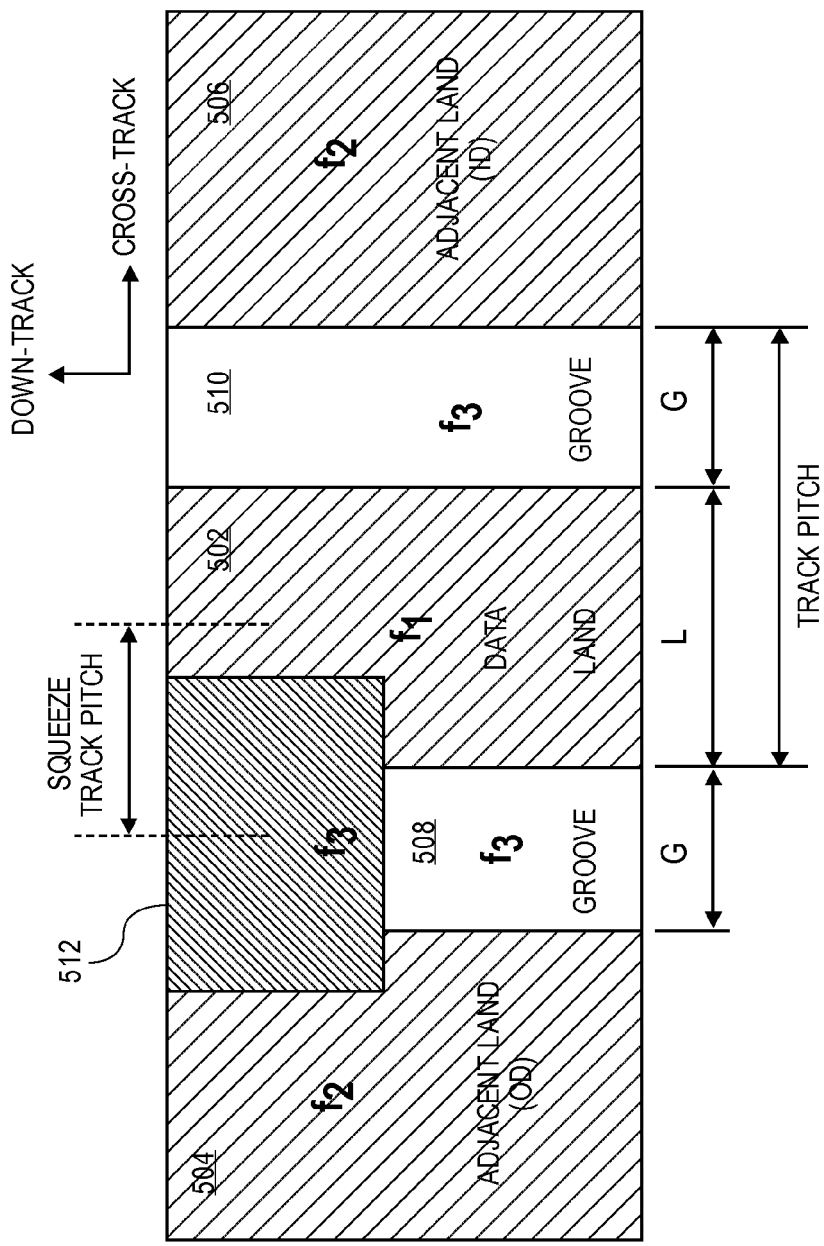
FIG. 5 is an illustration of writing to lands and grooves using square waves of certain frequencies according to an embodiment of the invention.

One approach for performing step 410 is shown in FIG. 5. In the embodiment illustrated in FIG. 5, each land and groove is written to using a square wave of a certain frequency. Specifically, data land 502 is written to using square wave frequency $f_1$, adjacent lands 504 and 506 are written to using square wave frequency $f_2$, and grooves 508 and 510 are written to using square wave $f_3$. Writing to lands using a different frequency than to grooves is advantageous because only signals written to lands are intended to be read back; signals written to grooves can be filtered out to simulate the effect of the non-magnetic grooves of a DTM disk. Only signals written to data land 502 and adjacent lands 504 and 506 are intended to be read back by embodiments. Signals written to grooves 508 and 510 are not intended to be read back to simulate the effect of non-magnetic grooves in a DTM format.

Note that the width of a land L, such as data land 502, adjacent land 504, or adjacent land 506, may be varied by trimming, a technique well known to those in the art. Also, the width of the grooves G can be varied by adjusting the distance between the data land and the adjacent lands.

After data is written to continuous disk 110 in a manner that simulates how data is stored on a DTM disk, in step 420, testing device 100 reads amplitude profiles for tracks on continuous media disk 110. Testing device 100 may read the amplitude profiles for the data land and adjacent lands (at ID and OD) written on disk 110 using narrow band or overwrite filters at various off-track positions. In this way, only the signal written to data land 502 and adjacent lands 504 and 506 are read back; signals written to grooves 508 and 510 are not read back.

Figure 6:
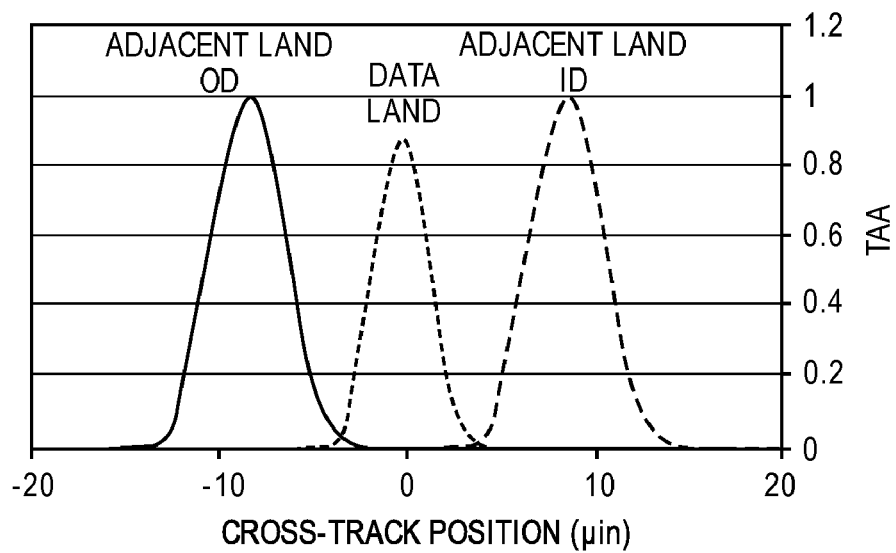
FIG. 6 is a graph of track averaged amplitude (TAA) profile data according to an embodiment of the invention.

FIG. 6 is a graph of track averaged amplitude (TAA) profile data obtained in step 420 according to an embodiment of the invention. A TAA profile is data that describes the amplitude of a signal read from locations on a track. As shown in FIG. 6, the amplitude of the signal written to the data land is the highest in the center of the data land, as would be expected. The amplitude of the signal written to the data land decreases with distance from the center of the data land.

In step 430, testing device 100 calculates a signal to noise profile (hereinafter a "SNR profile") and an off-track capability (OTC) for the SNR profile. In an embodiment, the SNR profile may be determined using an equation, such as:

$$SNR = 10\log_{10}\frac{TAA_{Data}^2}{\alpha TAA_{Data}^2 + TAA_{OD}^2 + TAA_{ID}^2}$$

In the above equation, the parameter a may be determined by measuring the integrated media signal-to-noise ratio (SNRm), and the parameter a may be calculated using the relation $SNRm = -10 \log_{10}\alpha$. $TAA_{Data}$, $TAA_{ID}$, and $TAA_{OD}$ are read-back amplitudes from the data land 502, adjacent land 506, and adjacent land 504, respectively.

Figure 7:
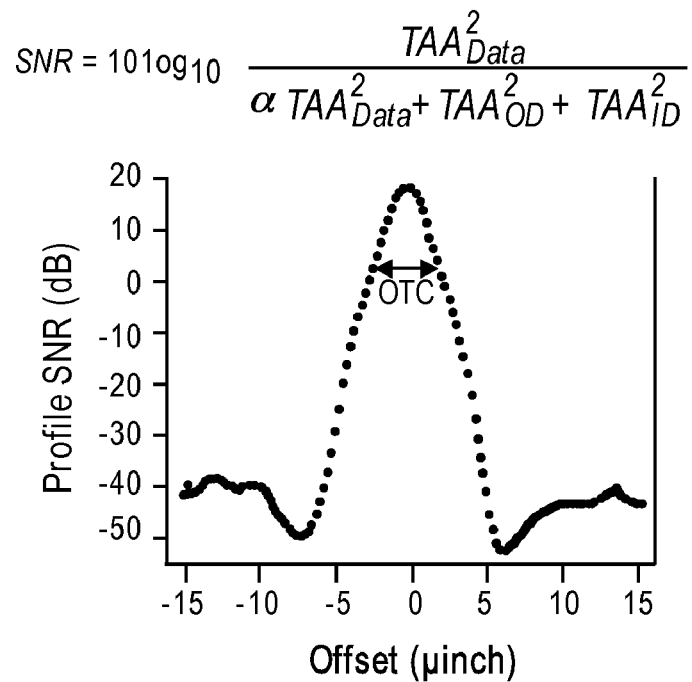
FIG. 7 is a graph depicting a calculated SNR profile according to an embodiment of the invention.

FIG. 7 is a graph depicting the SNR profile calculated in step 430 according to an embodiment of the invention. Once the SNR profile is obtained, testing device 100 may calculate the off-track capability (OTC) for the determined SNR profile. In an embodiment, the off-track capability (OTC) corresponds to the full width of the SNR profile at the given SNR level, as shown in FIG. 7. The wider the off-track capability (OTC), the narrower the track that is supported by the head.

In step 440, testing device 100 determines if the off-track capability (OTC) for a particular head is sufficient to support a given DTM track format. According to one approach, testing device 100 may performing this step using by deriving a signal-to-noise ratio based 747 curve to determine if the OTC for the particular head is sufficient for a given track. A 747 curve in this context is a measure of OTC versus squeeze track pitch. This is different than how a 747 curve is typically used, as typically a 747 curve is based on a Bit Error Rate (BER).

In an embodiment, to determine if a given head can support a particular DTM track format, testing device 100 determines the squeeze track pitch at which the OTC is 15% of the squeeze track pitch. Then, testing device 100 determines whether the DTM track pitch lengths L+G (as illustrated in FIG. 5) are equal to or greater than 110% of the squeeze track pitch previously obtained. If testing device 100 determines that the DTM track pitch lengths L+G (as illustrated in FIG. 5) are equal to or greater than 110% of the squeeze track pitch previously obtained, then testing device 100 determines that the head can support the particular DTM track format; otherwise, testing device 100 determines the head cannot support the particular DTM track format. Note that the percentages in this embodiment may differ than those used in other embodiments, as other thresholds may be used by other embodiments as these particular percentages are merely illustrative of one embodment.

Non-Limiting Example of an Embodiment

In an embodiment, testing device 100 is used to test head 102 with various DTM track formats on a continuous media disk 110. In the test, the DTM track pitches range from 3 to 10 μinch and the land width and groove width are equal. The magnetic core width of head 102 is 5 μinch.

Figure 8:
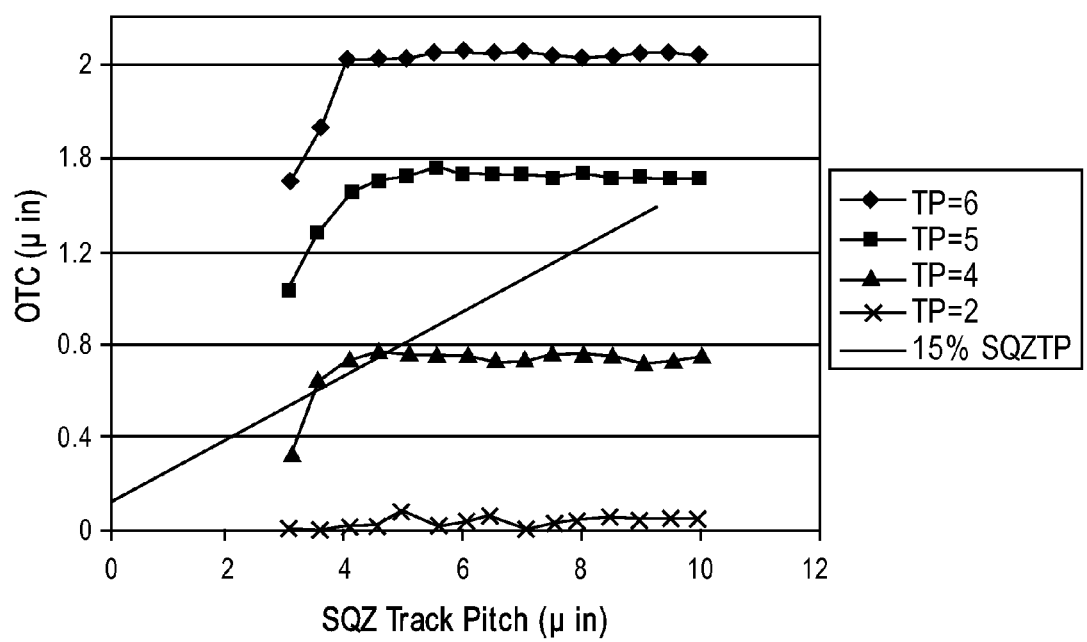
FIG. 8 is an illustration of evaluating which track pitch is best suited for a given head according to an embodiment of the invention.

FIG. 8 is an illustration of evaluating which track pitch is best suited for head 102 according to an embodiment of the invention. FIG. 8 depicts 747 curves of simulated DTM media with various track pitches (L+G) for head 102. As shown in FIG. 8, head 102 can support a DTM track pitch as small as 4 μinch. When comparing with recording using continuous media, the same head can achieve a track pitch of 4 μinch in DTM and 5.5 μinch track pitch in continuous media, which is a 37.5% increase in track density.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A testing device for selecting a discrete track media (DTM) format for use with a particular head of a hard-disk drive (HDD), comprising:
    a magnetic read/write head;
    a continuous magnetic-recording disk rotatably mounted on a spindle, wherein the continuous magnetic-recording disk stores data using a continuous media format;
    a drive motor having a motor shaft attached to the spindle for rotating the continuous magnetic-recording disk; and
    a testing module configured to simulate reading data, stored using a particular discrete track media (DTM) format, from said continuous magnetic-recording medium, including filtering out certain signals written to said continuous magnetic-recording medium tracks to simulate non-magnetic grooves of said particular discrete track media (DTM) format.

2. The testing device of claim 1, wherein the testing module is configured to simulate reading data, stored using a plurality of discrete track media (DTM) formats, from said continuous magnetic-recording medium, and wherein each of the plurality of discrete track media (DTM) formats has a different track pitch.

3. The testing device of claim 1, wherein the testing module is configured to write tracks on said continuous magnetic-recording medium that simulate the lands and grooves of the particular discrete track media (DTM) format.

4. The testing device of claim 3, wherein the testing module is configured to write said tracks by writing data to the lands and to the grooves using square waves of different frequencies.

5. The testing device of claim 1, wherein the testing module is configured to calculate a track averaged amplitude (TAA) profile, wherein the track averaged amplitude (TAA) profile describes the amplitude of a signal read from locations on a track.

6. The testing device of claim 1, wherein the testing module is configured to calculate a signal to noise ratio for a particular track on said continuous magnetic-recording medium.

7. The testing device of claim 1, wherein the testing module is configured to calculate an off-track capability (OTC) for the magnetic read/write head on a particular track on said continuous magnetic-recording medium.

8. The testing device of claim 1, wherein the testing module is configured to determine if an off-track capability (OTC), determined for the magnetic read/write head, supports the particular discrete track media (DTM) format.

9. The testing device of claim 1, wherein the testing module is configured to (a) determine a squeeze track pitch for a track format at which an off-track capability (OTC) of the magnetic read/write head is a first predetermined percentage of the squeeze track pitch, and (b) determine whether lengths of a land and a groove of the track format are equal to or greater than a second predetermined percentage of the determined squeeze track pitch.

10. A testing module for selecting a discrete track media (DTM) format for use with a particular head of a hard-disk drive (HDD), comprising:
    the testing module configured to simulate reading data, stored using a particular discrete track media (DTM) format, from said continuous magnetic-recording medium, including filtering out certain signals written to said continuous magnetic-recording medium tracks to simulate non-magnetic grooves of said particular discrete track media (DTM) format,
    wherein the testing module is comprised within a testing device for evaluating magnetic read/write heads.

11. The testing module of claim 10, wherein the testing module is configured to simulate reading data, stored using a plurality of discrete track media (DTM) formats, from said continuous magnetic-recording medium, and wherein each of the plurality of discrete track media (DTM) formats has a different track pitch.

12. The testing module of claim 10, wherein the testing module is configured to write tracks on said continuous magnetic-recording medium that simulate the lands and grooves of the particular discrete track media (DTM) format.

13. The testing module of claim 10, wherein the testing module is configured to write said tracks by writing data to the lands and to the grooves using square waves of different frequencies.

14. The testing module of claim 10, wherein the testing module is configured to calculate a track averaged amplitude (TAA) profile, wherein the track averaged amplitude (TAA) profile describes the amplitude of a signal read from locations on a track.

15. The testing module of claim 10, wherein the testing module is configured to calculate a signal to noise ratio for a particular track on said continuous magnetic-recording medium.

16. The testing module of claim 10, wherein the testing module is configured to calculate an off-track capability (OTC) for a magnetic read/write head on a particular track on said continuous magnetic-recording medium.

17. The testing module of claim 10, wherein the testing module is configured to determine if an off-track capability (OTC), determined for a magnetic read/write head, supports the discrete track media (DTM) format.

18. The testing module of claim 10, wherein the testing module is configured to (a) determine a squeeze track pitch for a track format at which an off-track capability (OTC) of the magnetic read/write head is a first predetermined percentage of the squeeze track pitch, and (b) determine whether lengths of a land and a groove of the track format are equal to or greater than a second predetermined percentage of the determined squeeze track pitch.

19. A method for selecting a discrete track media (DTM) format for use with a particular head of a hard-disk drive (HDD), comprising:
  writing to a plurality of tracks of a continuous media disk in a manner that simulates a discrete track media (DTM) disk, including writing tracks on said continuous media disk that simulate the lands and grooves of said discrete track media (DTM) format;
  reading amplitude profile for a particular track and adjacent tracks, including filtering out certain signals written to said continuous media disk tracks to simulate non-magnetic grooves of a discrete track media (DTM) disk;
  determining the signal to noise ratio from the amplitude profile and the off-track capability for the signal-to-noise ratio; and
  determine if the off-track capability is sufficient to support a particular DTM track format.

20. The method of claim 19, wherein determining if the off-track capability is sufficient comprises:
  determining a squeeze track pitch for a track format at which the off-track capability is a first predetermined percentage of the squeeze track pitch, and
  determining whether lengths of a land and a groove of the track format are equal to or greater than a second predetermined percentage of the determined squeeze track pitch.

* * * * *